(12) United States Patent
Yu

(10) Patent No.: US 10,511,210 B2
(45) Date of Patent: Dec. 17, 2019

(54) DEVICE FOR THE THERMAL MANAGEMENT OF AN ELECTRIC POWER TRAIN

(71) Applicant: Nissan Motor Co., Ltd., Yokohama-shi, Kanagawa (JP)

(72) Inventor: Robert Yu, Montigny le Bretonneux (FR)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 128 days.

(21) Appl. No.: 15/767,412

(22) PCT Filed: Oct. 3, 2016

(86) PCT No.: PCT/FR2016/052521
§ 371 (c)(1),
(2) Date: Apr. 11, 2018

(87) PCT Pub. No.: WO2017/064390
PCT Pub. Date: Apr. 20, 2017

(65) Prior Publication Data
US 2018/0294693 A1 Oct. 11, 2018

(30) Foreign Application Priority Data

Oct. 15, 2015 (FR) ...................................... 15 59797

(51) Int. Cl.
*H02K 5/20* (2006.01)
*H02K 7/116* (2006.01)
(Continued)

(52) U.S. Cl.
CPC ............... *H02K 9/19* (2013.01); *F01M 5/005* (2013.01); *H02K 5/20* (2013.01); *H02K 7/116* (2013.01);
(Continued)

(58) Field of Classification Search
CPC . H02K 9/19; H02K 5/20; H02K 7/116; F01M 5/005; F01M 2011/0075; F01M 2011/0045; B60L 2240/36; B60L 3/0061
(Continued)

(56) References Cited

U.S. PATENT DOCUMENTS 5,156,579 A * 10/1992 Wakuta ................. H02K 7/116
475/161
6,833,641 B2 * 12/2004 Uchida .................... B60K 6/26
310/54
(Continued)

FOREIGN PATENT DOCUMENTS

CN 203645464 U 6/2014

*Primary Examiner* — John K Kim
(74) *Attorney, Agent, or Firm* — Young Basile Hanlon & MacFarlane, P.C.

(57) ABSTRACT

A device for the thermal management of a power train includes a main housing accommodating an electric motor and its cooling circuit and a speed reducer including a lubrication circuit. The main housing includes an oil sump arranged in the lower part of the main housing and a partition separating same into two parts, wherein there are arranged respectively, on the one hand, the motor and its cooling circuit, and on the other hand, the speed reducer and its lubrication circuit, while an oil channel extends in the oil sump through the partition in order to bring the two parts into communication and includes one end on the speed reducer side provided with a valve for regulating the oil flow, controlled by the oil temperature, so as to close the oil passage in the oil channel when the oil temperature on the speed reducer side reaches a predetermined temperature threshold.

12 Claims, 3 Drawing Sheets

(51) Int. Cl.
*H02K 9/19* (2006.01)
*F01M 5/00* (2006.01)
*F01M 11/00* (2006.01)
*B60L 3/00* (2019.01)

(52) U.S. Cl.
CPC ......... *B60L 3/0061* (2013.01); *B60L 2240/36* (2013.01); *F01M 2011/0045* (2013.01); *F01M 2011/0075* (2013.01)

(58) Field of Classification Search
USPC .................................................. 310/52, 54
See application file for complete search history.

(56) References Cited

U.S. PATENT DOCUMENTS

| | | | | |
|---|---|---|---|---|
| 9,022,174 | B2* | 5/2015 | Takagi | B60K 6/445 |
| | | | | 184/6.12 |
| 2004/0124722 | A1* | 7/2004 | Uchida | B60K 6/26 |
| | | | | 310/54 |
| 2012/0091835 | A1* | 4/2012 | Kim | B60K 6/26 |
| | | | | 310/54 |
| 2014/0174856 | A1* | 6/2014 | Takagi | B60K 6/445 |
| | | | | 184/6.12 |
| 2018/0294693 | A1* | 10/2018 | Yu | F01M 5/005 |

\* cited by examiner

DEVICE FOR THE THERMAL MANAGEMENT OF AN ELECTRIC POWER TRAIN

CROSS REFERENCE TO RELATED APPLICATION

This application claims priority to and the benefit of French Application Patent Serial No. 1559797, filed Oct. 15, 2015, the entire disclosure of which is hereby incorporated by reference.

TECHNICAL FIELD

The present invention relates to a device for the thermal management of a power train of a motor vehicle, notably of the electric or hybrid type.

BACKGROUND

Among the systems for cooling the electric motors of electric or hybrid vehicles, it is known to use the lubrication oil of the transmission system constituted by the speed reducer that is conventionally coupled to the electric motor. The use of the lubrication oil of the speed reducer for direct cooling of the heating elements, such as coils, magnets, sheets, of the electric motor in fact constitutes a relatively effective solution compared to the other known solutions such as those which utilize cooling with water circulating around the housing of the electric motor, or even cooling with air, to the extent that the oil may be in direct contact with all the components to be cooled. The use of the lubrication oil of the speed reducer to cool the heating elements of the electric motor further permits the friction of the transmission system when cold to be reduced because the lubrication oil introduced into the transmission system in this way is less viscous as a result of being heated in the electric motor. Particularly well known is document CN203645464, which describes a motor and a speed reducer that are cooled by the same oil circulating in a circuit combining the cooling oil of the motor and the lubrication oil of the speed reducer.

However, these cooling systems require the removal of the heat stored by the oil that is used jointly for cooling the motor and for lubrication of the speed reducer. A heat exchanger of the oil/air radiator type disposed on the front face of the vehicle is used for this purpose, or alternatively an oil/water exchanger mounted at the level of the power train and supplemented by a water circuit and a water/air exchange radiator on the front face of the vehicle. As a variant, the calories generated in the motor and in the transmission system may be removed by a flow of air, notably a flow of air exiting from the fan on the front face of the air conditioning condenser for the passenger compartment of the vehicle. This flow of air, which may be ventilated either by this fan or by the forward movement of the vehicle, circulates around the assembly constituted by the motor housing and the transmission system in order to ensure the desired heat exchange.

It has been established that, in the case of high-performance vehicles, there is a need to increase the heat exchange performance between the air and the housing of the electric power train of the vehicle.

Furthermore, when the assembly of the electric motor and its associated speed reducer produce a large amount of calories, it is desirable for the temperature of the oil to be capable of being higher in order to facilitate the removal of the thermal energy produced in the direction of the air heat exchanger. However, if the speed reducer may be lubricated by an oil at a temperature in the order of 130-145° C., in the context of a cooling solution having an oil circulation circuit combining the engine oil and the lubrication oil of the speed reducer, the temperature of the latter is limited by the operating constraints of the motor which impose an oil temperature in the order of 90-100° C. In addition, when hot, that is to say when the electric power train is producing a large amount of thermal energy, the operating temperature of the speed reducer is limited, which has an adverse impact on the cooling capacity of the ventilated air passing around the housing of the power train. In fact, the greater the difference in temperature between this ventilated air and the housing of the power train exposed to this flow of air, the better the global cooling performance of the speed reducer and of the assembly of the electric motor and its associated speed reducer.

The need also exists for a device for the thermal management of an electric power train, which, while retaining the advantages associated with the combination of the engine oil and the oil of the speed reducer, in particular during operation of the power train when cold, overcomes the aforementioned disadvantages, in particular during operation of the power train when hot.

SUMMARY

For this purpose, a device for the thermal management of an electric power train is proposed including a main housing accommodating at least an electric motor including a cooling circuit and a mechanical speed reducer coupled to the motor and including a lubrication circuit capable of being connected to the cooling circuit of the motor, characterized in that the main housing includes an oil sump, common to the cooling circuit and to the lubrication circuit, arranged in a lower part of the main housing, and a partition for the separation of the main housing into two parts, in which there are arranged respectively, on the one hand, the motor and its cooling circuit, and, on the other hand, the speed reducer and its lubrication circuit, the oil sump including an oil overflow passage through the separating partition and, beneath the oil overflow passage, an oil channel extending through the separating partition between the two parts, the oil channel including one end discharging into the oil sump on the speed reducer side provided with a valve for regulating the flow of oil between the two parts, controlled by the temperature of the oil, and one opposite free end, discharging into the oil sump on the motor side, the controlled valve being adapted to close the passage of oil in the channel between the two parts when the temperature of the oil on the speed reducer side reaches a predefined temperature threshold, so that the oil stored on the motor side and the oil stored on the speed reducer side do not mix when the temperature threshold is reached.

Thanks to this arrangement, at a certain temperature level of the oil of the speed reducer, for example in the order of 90° C., corresponding to the operation when hot of the whole of the system including the motor plus the transmission, the control of the valve causing it to close permits the isolation, in the oil sump, of the oil stored in the part on the speed reducer side from the oil stored in the part on the motor side. Under these operating conditions, the oil on the motor side is thus separated from the oil on the speed reducer side, whereas the oil on the motor side is combined with the oil on the speed reducer side, during operation when cold, for example for an oil temperature below 90° C. The temperature of the oil in the two parts, respectively on the motor side and on the speed reducer side, may thus be differentiated, so that the speed reducer may function, when hot, in other words when the temperature of the oil on the speed reducer side reaches the predefined temperature threshold, at a higher temperature than that of the electric motor. In fact, given that the temperatures of the oil respectively on the speed reducer side and on the motor side are independent in the configuration involving the closure of the valve, the oil on the speed reducer side may be allowed to rise to a higher temperature, and the operating temperature of the speed reducer may thus be increased. It is thus possible to increase the cooling performance of the speed reducer and of the assembly including the electric motor and speed reducer, without compromising the operation of the electric motor. Furthermore, when cold, in other words when the temperature of the oil on the speed reducer side is lower than the predefined threshold temperature, the valve is open and the cooling oil coming from the motor and having stored thermal energy is combined with the oil on the speed reducer side for its lubrication, allowing the cold lubrication of the speed reducer with the hot oil originating from the motor, so that the friction of the speed reducer will be reduced and its performance will be improved.

Thus, the inventive device permits a differentiation to be made, in the sense that they are rendered independent of one another, between the cooling circuit of the motor and the lubrication circuit of the speed reducer, depending on the temperature of the oil on the speed reducer side. More precisely, thanks to the valve for managing the flow of oil that is integrated in the oil sump, which is capable of controlling selectively, depending on the temperature of the oil, whether the circulation of the oil between the two parts on the motor side and on the speed reducer side is permitted or prevented, the inventive device makes it possible, when cold, to combine the cooling oil of the motor with the lubrication oil of the speed reducer and, when hot, to separate the oil of the motor from the oil of the speed reducer.

According to one embodiment, the opposite free end of the oil channel cooperates with an oil inlet of the cooling circuit, via which the cooling circuit is capable of sucking the oil, on the one hand from the oil channel, and on the other hand directly from the part on the motor side of the oil sump.

Preferably, the oil inlet includes an inlet pipe having a cross-section substantially greater than that of the oil channel, so that the oil channel and the inlet pipe are disposed facing towards one another with a clearance between them allowing the cooling circuit to suck the oil from the part of the oil sump on the motor side through the clearance when the flow regulation valve is closed.

Advantageously, the cooling circuit includes an oil pump connected, on the one hand to the oil inlet, and on the other hand to an oil distribution circuit of the cooling circuit allowing the projection of the oil sucked by the pump onto the heating elements of the electric motor in such a way as to cool the motor, whereas the oil thus projected is collected in the part of the oil sump on the motor side.

Advantageously, the electric motor includes a motor housing including a floor, towards which the oil projected by the distribution circuit onto the heating elements of the motor flows by gravity, and a flow orifice formed in the vicinity of the floor allowing the return by gravity of the oil in the part of the oil sump on the motor side.

Preferably, the lubrication circuit includes an oil pump capable of sucking the oil from the part of the oil sump on the speed reducer side, the oil pump being connected to a distribution circuit of the lubrication circuit allowing the projection of the oil sucked by the pump onto rotating elements of the speed reducer in such a way as to lubricate the speed reducer.

Advantageously, the device may comprise a bypass pipe linking the oil distribution circuit of the cooling circuit and the oil distribution circuit of the lubrication circuit to either side of the separating partition, the bypass pipe being equipped with a thermostat capable of controlling selectively the circulation of oil in the bypass pipe depending on the temperature of the oil, the circulation being permitted in a temperature condition that is lower than the predefined temperature threshold and being prevented in a temperature condition that is higher than the predefined temperature threshold.

According to another embodiment, the end of the oil channel provided with the flow regulation valve cooperates with an oil inlet of the lubrication circuit, via which the lubrication circuit is capable of sucking the oil, on the one hand from the oil channel, and on the other hand directly from the part on the speed reducer side of the oil sump.

Preferably, the oil inlet includes an inlet pipe having a cross-section substantially greater than that of the oil channel, so that the oil channel and the inlet pipe are disposed facing towards one another with a clearance between them allowing the lubrication circuit to suck the oil from the part of said oil sump on the speed reducer side through the clearance when the flow regulation valve is closed.

Advantageously, the lubrication circuit includes an oil pump connected, on the one hand to the oil inlet, and on the other hand to an oil distribution circuit of the lubrication circuit allowing the projection of the oil sucked by the pump onto rotating elements of the speed reducer in such a way as to lubricate the speed reducer.

Advantageously, the main housing includes external walls equipped with a plurality of cooling fins.

The invention also relates to a motor vehicle including a thermal management device as described above.

BRIEF DESCRIPTION OF THE DRAWINGS

Other characterizing features and advantages of the invention will emerge from a perusal of the following description of a particular embodiment of the invention, which is given by way of illustrative but non-exhaustive example, with reference to the accompanying Figs., in which.

In the Figs., the elements in common bear the same reference designations.

DETAILED DESCRIPTION

Figure 1:
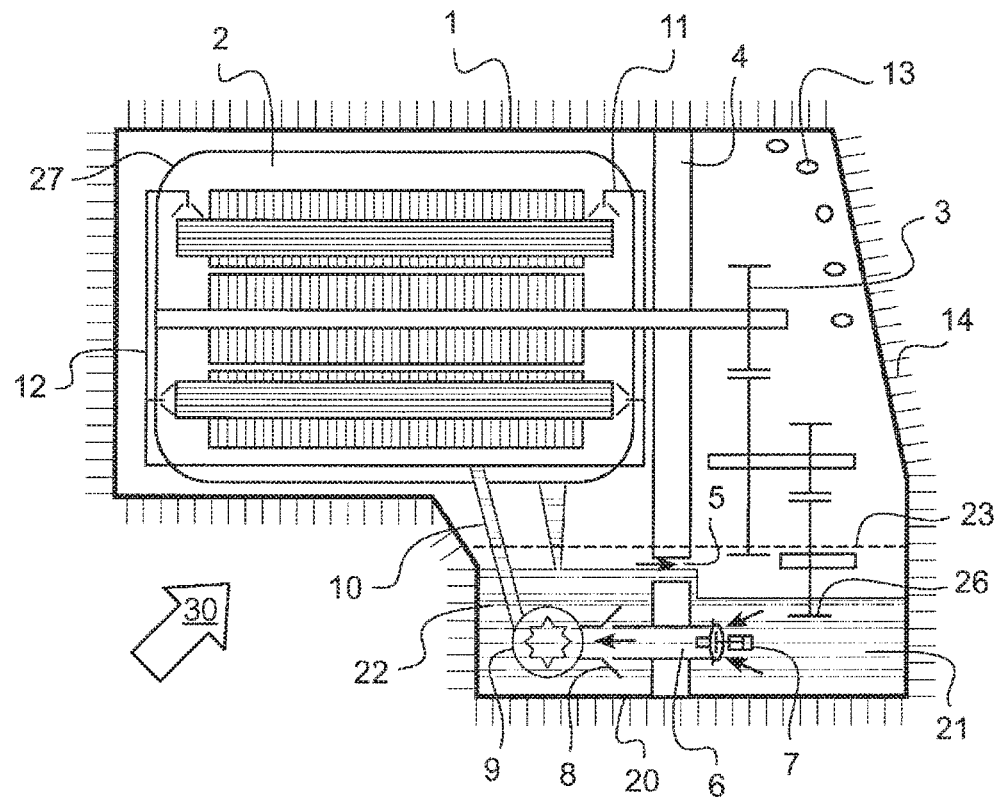
FIG. 1 is a diagram illustrating the inventive thermal management device according to a first embodiment in a condition of operation when cold.

According to the embodiment illustrated in FIG. 1, the thermal management device includes a main housing 1, of which the external walls that are exposed to a flow of air 30 are equipped with cooling fins 14, promoting the transfer of heat between the walls of the main housing and the flow of air. According to the example in FIG. 1, a single electric motor 2 is integrated in the interior of the main housing 1. However, a plurality of motors could be integrated without departing from the framework of the present invention. The electric motor 2 is intended for the propulsion of an electric or hybrid vehicle, in which it is carried on-board, and/or for the recovery of its kinetic energy during a braking phase of the vehicle. The main housing 1 also integrates a mechanical speed reducer 3 coupled to the electric motor 2 in the interior of the main housing 1 and constituted by a system of pinions intended to cause the speed of rotation and the torque of the electric motor 2 to vary in relation to the speed of the vehicle.

The main housing 1 includes a separating partition 4 which allows the internal volume of the housing to be separated into two parts, respectively a part where the electric motor 2 is arranged and a part where the speed reducer 3 is arranged. The lower part of the main housing 1 also defines an oil sump 20 extending to either side of the separating partition 4, and intended to store the lubrication oil 21 of the speed reducer 3 and the cooling oil 22 of the electric motor 2. An oil overflow passage 5 is provided through the separating partition 4 in a lower part of the latter, so that the level of oil 23 in the oil sump 20 prior to starting the vehicle, that is to say when the cooling oil and the lubrication oil in its entirety has fallen into the oil sump 20, is situated substantially above the oil overflow passage 5.

The oil sump also includes, disposed below the overflow passage 5, an oil channel 6 which extends through the separating partition 4 and which enables the two parts respectively on the motor side and on the speed reducer side to communicate with one another. The oil channel 6 includes one end discharging into the oil sump on the speed reducer side 3, which is provided with a valve 7 for regulating the flow of oil between the two parts, controlled by the temperature of the oil, and one opposite free end, discharging into the oil sump on the motor side. The valve 7 controlled by the temperature of the oil on the speed reducer side is adapted to close the passage of oil in the oil channel 6 between the two parts on the speed reducer side and on the motor side, when the temperature of the oil on the speed reducer side reaches a predefined temperature threshold, for example 90° C. The valve 7 controlled by the temperature of the oil on the speed reducer side includes, for example, a thermostat actuated by a wax capsule which is arranged to act on a flap mounted on the oil channel 6 as soon as the temperature of the wax capsule exceeds the predefined temperature threshold. In this way, the valve 7 enables the circulation of oil through the oil channel 6 between the two parts on the motor side and on the speed reducer side to be permitted when the oil temperature is lower than the predefined temperature threshold, corresponding to an operating condition of the power train when cold, and enables this circulation of oil between the two parts to be prevented when the temperature of oil reaches the predefined temperature threshold, corresponding to a condition of operation of the power train when hot.

According to the embodiment in FIG. 1, the opposite free end of the oil channel 6, which discharges into the oil sump on the motor side, cooperates with an oil inlet 8 of a cooling circuit of the motor, which is adapted to suck the oil from the oil sump and to project at least a part of the oil onto heating elements of the electric motor 2, for example onto the coil ends of the motor, in such a way as to cool the motor, whereas the oil thus projected is collected in the part of the oil sump on the motor side. In order to do this, the cooling circuit of the motor includes an oil pump 9 connected, on the one hand to the oil inlet 8, and on the other hand to its outlet, to an oil distribution circuit 10, 12 allowing the oil 11 sucked by the pump 9 to be supplied and projected onto the heating elements of the electric motor 2. The projected oil recovers the thermal energy produced by the motor 2 and then returns to the oil sump by gravity. More precisely, the electric motor 2 includes a motor housing 27 including a floor, towards which the oil projected by the distribution channels 10, 12 onto the heating elements of the motor flows by gravity, and a flow orifice formed in the vicinity of the floor allowing the return by gravity of the oil into the part of the oil sump on the motor side.

The oil inlet 8 of the cooling circuit of the motor is arranged more particularly in order to permit the pump 9 of the cooling circuit to suck the oil, on the one hand from the oil channel 6, and on the other hand directly from the part on the motor side of the oil sump. In order to do this, according to the embodiment in FIG. 1, the oil inlet 8 includes an inlet pipe having a cross-section substantially greater than that of the oil channel 6, for example a section of substantially flared shape, which arrives substantially in alignment with and facing towards the free end of the oil channel 6 discharging on the motor side, so that the oil channel 6 and the inlet pipe 8 may be disposed facing towards one another having a certain clearance between them, allowing the pump 9 to suck the oil directly in the oil sump on the motor side through this clearance when the valve 7 is closed. Otherwise, when the valve 7 is open, the oil is sucked by the pump 9 of the cooling circuit primarily from the oil sump on the speed reducer side through the oil channel 6, because of the difference in the sections of the oil passageways constituted by the oil channel 6, on the one hand, and by the clearance created between the latter and the inlet pipe 8. For example, the section of the oil passageway constituted by the clearance created between the inlet pipe of oil 8 connected to the pump 9 of the cooling circuit and the oil channel 6 facing towards it is dimensioned so as to be 3 to 5 times smaller than the section of the oil passageway on the valve side 7, defined by the section of the oil channel 6.

Thus, as indicated above, prior to starting the vehicle, the system is cold, the oil in its entirety has fallen into the oil sump 20 in the lower part of the main housing 1 and the level of the oil 23 is just above the oil overflow passage. In these conditions, the valve 7 is open, so that the circulation of oil is permitted in the oil channel 6 between the two parts on the motor side and on the speed reducer side of the oil sump 20. Starting of the vehicle actuates the pump 9 of the cooling circuit, which sucks the oil arriving primarily from the part of the oil sump on the speed reducer side through the section of the oil passageway constituted by the oil channel 6 (the path of the sucked oil is symbolized by arrows in FIG. 1), whereas a very small quantity of oil is sucked directly from the part of the oil sump on the motor side, because of the differences in the dimensioning of the sections of the oil passageways concerned, as explained above.

The sucking of the oil primarily from the part of the oil sump on the speed reducer side lowers the oil level 23. The oil thus sucked is fed via the pump 9 to the distribution circuit 10, 12, which supplies the oil to the heating elements of the motor to be cooled, where it is projected, for example onto the coil ends. The oil then falls by gravity into the part of the oil sump on the motor side. On the speed reducer side, the latter is adapted, when it is being driven in displacement, so as to project the oil stored in the part of the oil sump on the speed reducer side against internal walls of the main housing. Thus, the system of pinions constituting the speed reducer 3 is partially immersed in the oil stored in the part of the oil sump on the speed reducer side, the teeth of the pinion 26 supply the oil towards the top of the housing, and at the same time the speed of rotation projects the oil 13 towards the internal walls of the housing, where the oil surrenders its calories through an exchange of heat with the housing, which surrenders it to the air 30 circulating around the housing.

The level of oil in the oil sump on the speed reducer side falls more rapidly than the level of oil in the part of the oil sump on the motor side. In fact, the oil stored on the speed reducer side is sucked by the pump 9 of the cooling circuit more rapidly than the oil stored on the motor side, which is sucked only weakly through the clearance left between the inlet pipe 8 of the cooling circuit and the oil channel 6. The oil on the speed reducer side is in addition projected by the pinions of the speed reducer towards the internal walls of the housing, which also helps to reduce the oil level on the speed reducer side more rapidly than that on the motor side. On the motor side, the oil heated by the motor and collected by gravity in the oil sump is able to pass from the motor side towards the speed reducer side through the oil overflow passage 5 formed in the separating partition. Thus, the oil that has been heated in the motor may be introduced on the speed reducer side and may be used for its lubrication, which allows the friction of the pinions of the speed reducer to be reduced advantageously when the latter is cold or also when the motor gives off more calories than the speed reducer.

After starting, the system in its entirety, in other words the oil, the motor, the speed reducer and the housing, heats up, which results in an increase in temperature. At the same time, the flow of air 30 circulating around the main housing 1 permits the system in its entirety to be cooled by the transfer of heat with the fins 14 equipping the external walls of the main housing 1. If the ambient temperature is not very high, a thermal balance may be established and the temperature of the system may be maintained at a relatively low temperature, for example in the order of 60° C. to 90° C. On the other hand, when the ambient temperature is relatively high, for example in the order of 45° C., the flow of air circulating around the housing is not sufficient to maintain the temperature of the oil at a sufficiently low level, for example below 90° C. The speed reducer tolerates the increases in temperature much better than the motor, so that, in these conditions, it is desirable to allow the oil stored in the oil sump on the speed reducer side to increase in temperature to a higher level than the oil on the motor side and, as a result thereof, when hot, to separate the oil on the motor side from the oil on the speed reducer side.

Figure 2:
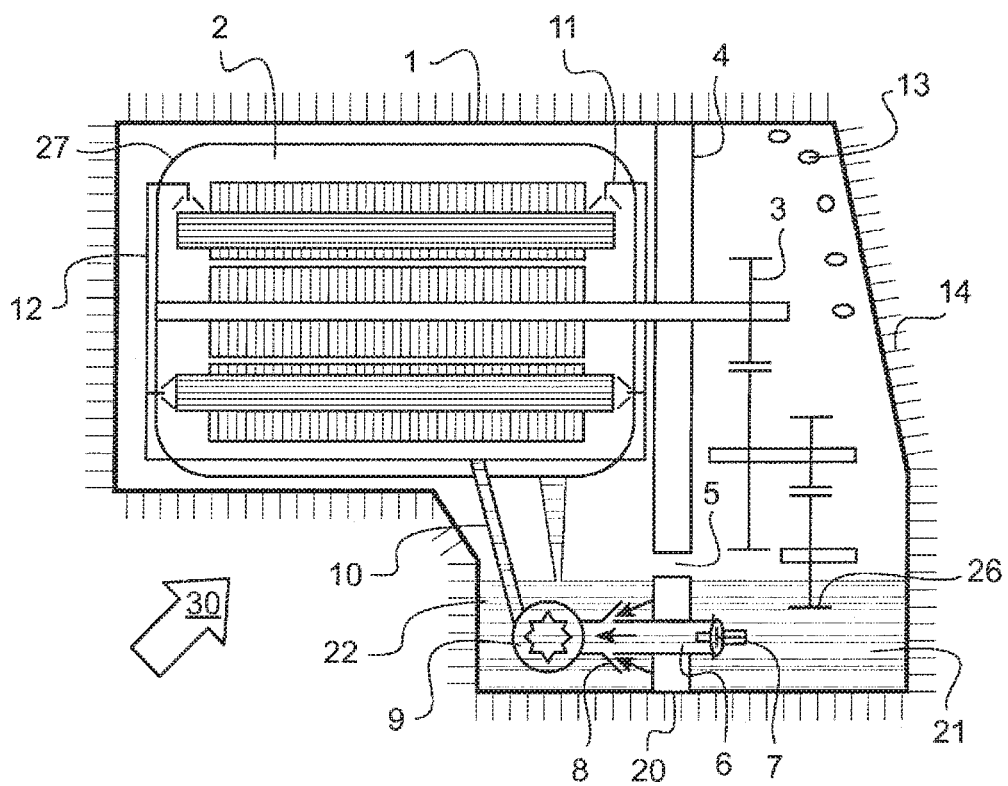
FIG. 2 is a diagram illustrating the device depicted in FIG. 1 in a condition of operation when hot.

Also, when the temperature of the oil on the speed reducer side reaches a temperature threshold, for example set at 90° C., the wax of the thermostat equipping the valve 7 dilates and closes the flap for the passage of oil from the oil channel 6, in so doing preventing the circulation of oil through this channel between the speed reducer side and the motor side. In these conditions, as illustrated in FIG. 2 by the arrows symbolizing the path of the oil sucked by the pump 9 of the cooling circuit, the pump 9 sucks only the oil stored on the motor side through the clearance created between the inlet pipe 8 of the cooling circuit and the oil channel 6, so that the level of oil on the motor side falls until it drops just below the oil overflow passage 5 linking the motor side and the speed reducer side. In this way, the oil in the oil sump on the motor side is separated from the oil in the oil sump on the speed reducer side. Their temperature thus becomes independent. It is thus possible to allow the temperature of the oil on the speed reducer side to increase, and to maintain the correct operation of the electric motor.

Figure 3:
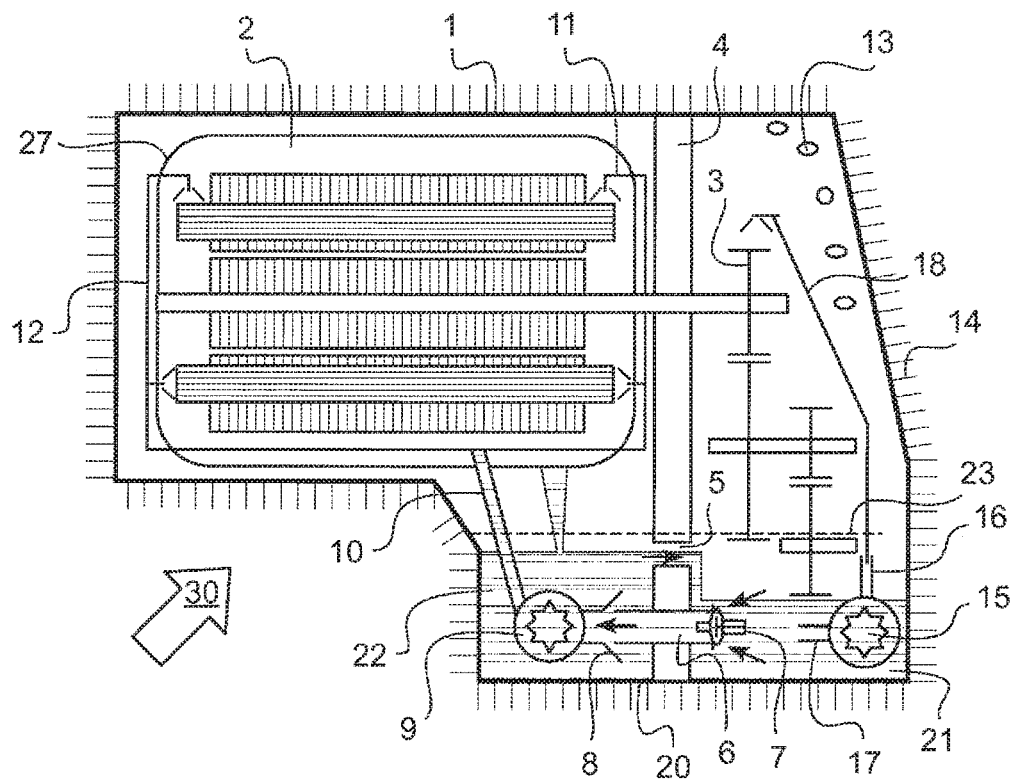
FIG. 3 illustrates a variant of the first embodiment.

According to a variant embodiment illustrated in FIG. 3, the lubrication of the speed reducer may make it necessary for lubrication to be provided by means of an oil pump. In this case, the lubrication circuit includes, on the speed reducer side, an oil pump 15 arranged to suck the oil from the oil sump on the speed reducer side by means of an oil inlet including an inlet pipe 17, to which it is connected, immersed in the oil stored on the speed reducer side, and an oil distribution circuit 16, 18 connected to the outlet from the pump 15 and capable of supplying the oil towards the rotating elements of the speed reducer 3 in order to feed it with oil.

Figure 4:
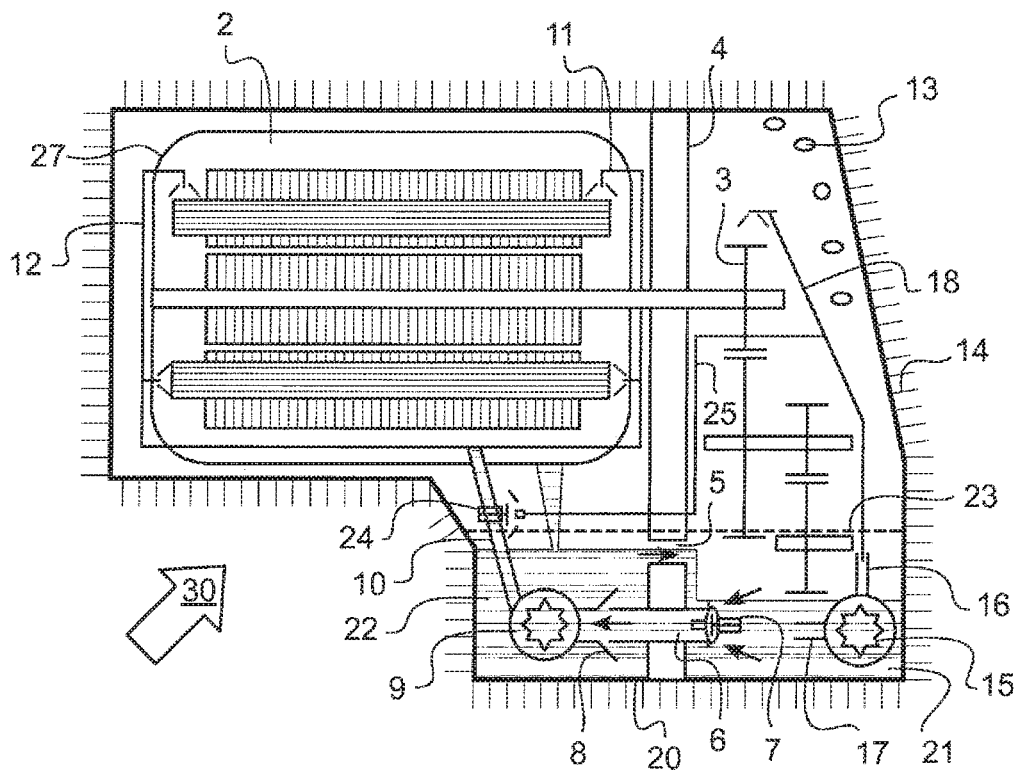
FIG. 4 illustrates a further variant of the first embodiment.

FIG. 4 illustrates a variant embodiment in the case in which the lubrication circuit of the speed reducer utilizes an oil pump, as illustrated in FIG. 3. According to this variant, a bypass pipe 25 is provided in order to link the oil distribution circuit 10, 12 of the cooling circuit on the motor side and the oil distribution circuit 16, 18 of the lubrication circuit on the speed reducer side, to either side of the separating partition 4. The bypass pipe 25 is equipped in addition with a thermostat 24 capable of controlling the circulation of oil in the bypass pipe 25 selectively depending on the temperature of the oil, the circulation being permitted in a temperature condition below the set temperature threshold and being prevented in a temperature condition above this temperature threshold. Thus, when the temperature is below the temperature threshold, for example 90° C., the oil is able to circulate in the bypass pipe 25. In this case, the pump 15 of the lubrication circuit does not operate, and it is the pump 9 of the cooling circuit that supplies oil both to the cooling circuit for cooling of the motor and to the lubrication circuit for the lubrication of the speed reducer. On the other hand, when hot, when the temperature of the oil reaches the temperature threshold, for example 90° C., the thermostat 24 requests the closure of the circulation of oil through the bypass pipe 25. In these conditions, the pump 15 of the lubrication circuit supplies this circuit with oil, and the pump 9 of the cooling circuit supplies this circuit with oil. The two circuits thus become independent in these oil temperature conditions.

Figure 5:
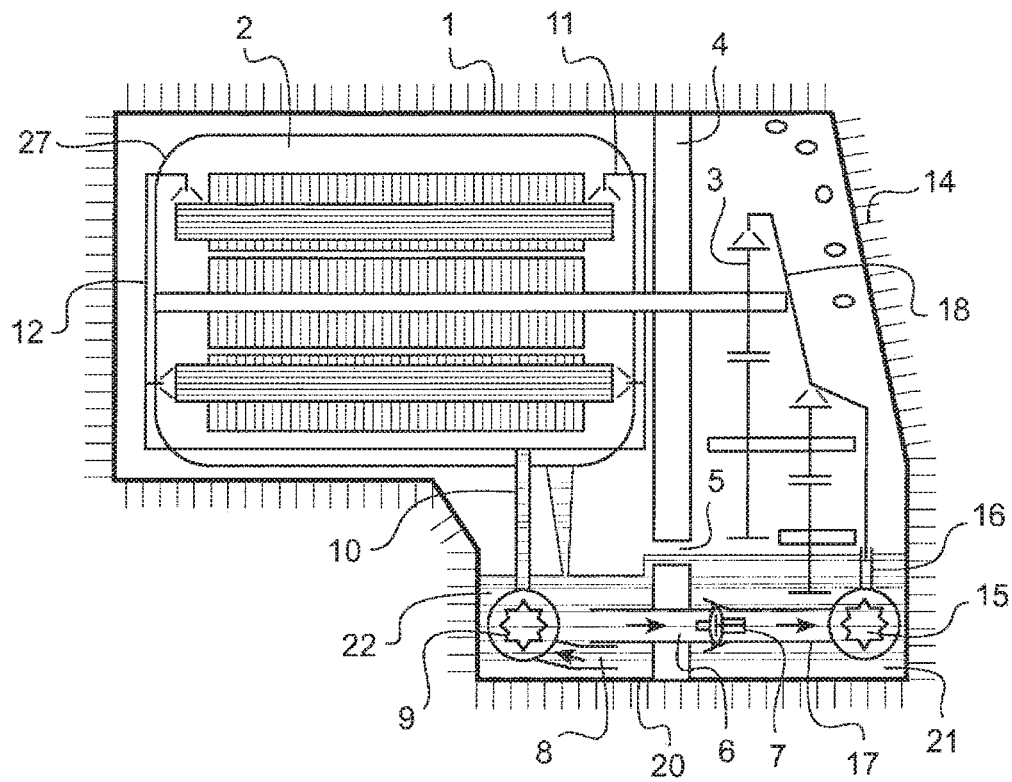
FIG. 5 is a diagram illustrating the inventive thermal management device according to a second embodiment in a condition of operation when cold.
Figure 6:
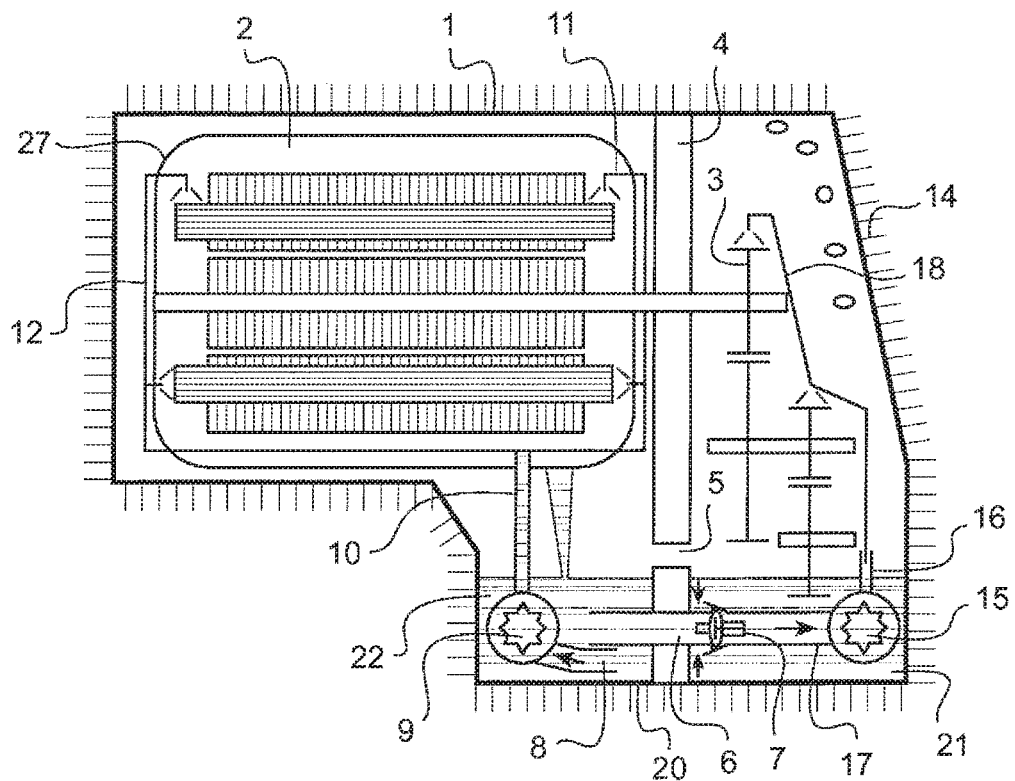
FIG. 6 is a diagram illustrating the device depicted in FIG. 5 in a condition of operation when hot.

FIGS. 5 and 6 illustrate an embodiment in which the free end of the oil channel 6 on this occasion discharges freely into the oil sump on the motor side, whereas the oil inlet pipe 8 of the cooling circuit connected to the inlet to the oil pump 9 is arranged in the oil sump, for example below the oil channel 6, for example below the latter.

The other end of the oil channel 6 on the speed reducer side, which is provided with the valve 7, is thus provided in order to cooperate on the speed reducer side with the oil inlet 17 of the lubrication circuit of the speed reducer by utilizing an oil pump 15, according to a mode of cooperation similar to that described with reference to FIG. 1 involving the free end of the oil channel 6 and the inlet pipe 8 of the cooling circuit.

The oil inlet 17 of the lubrication circuit of the speed reducer is thus arranged, according to this embodiment, in order to permit the pump 15 of the lubrication circuit to suck the oil, on the one hand from the oil channel 6, and on the other hand directly from the part on the speed reducer side of the oil sump. In order to do this, the oil inlet 17 includes an inlet pipe having a cross-section substantially greater than that of the oil channel 6, for example a section of substantially flared shape, which arrives substantially in alignment with and facing towards the end of the oil channel 6 provided with the valve 7 discharging on the speed reducer side, so that the oil channel 6 and the inlet pipe 17 may be disposed facing towards one another with a certain clearance between them, allowing the pump 15 to suck the oil directly in the oil sump on the speed reducer side through this clearance when the valve 7 is closed. Otherwise, when the valve 7 is open, the oil is sucked by the pump 15 of the lubrication circuit primarily from the oil sump on the motor side through the oil channel 6, because of the difference in the oil passage sections constituted by the oil channel on the one hand, and by the clearance created between the latter and the inlet pipe 17. For example, the oil passage section constituted by the clearance created between the oil inlet pipe 17 of the lubrication circuit and the oil channel 6, is dimensioned so as to be 3 to 5 times smaller than the oil passage section on the valve side 7, as defined by the section of the oil channel 6.

Thus, as for the previous embodiment, when the temperature of the oil on the speed reducer side is lower than the fixed temperature threshold, for example 90° C., the valve 7 is open and the lubrication of the speed reducer may be undertaken with oil heated by the motor, which is sucked from the oil sump on the motor side by the pump 15 of the lubrication circuit on the speed reducer side, through the oil channel 6 (FIG. 5). When the temperature of the oil reaches the fixed temperature threshold, the passage for oil through the oil channel 6 is closed, so that the pump 15 of the lubrication circuit sucks only the oil stored on the speed reducer side through the clearance created between the inlet pipe 17 of the lubrication circuit and the oil channel 6, and the oil on the speed reducer side does not mix with the oil on the motor side (FIG. 6).

The invention claimed is:

1. A device for the thermal management of an electric power train of an electric or hybrid motor vehicle, comprising a main housing accommodating at least an electric motor comprising a cooling circuit and a mechanical speed reducer coupled to the motor and comprising a lubrication circuit capable of being connected to the cooling circuit of the motor, wherein the main housing comprises an oil sump, common to the cooling circuit and to the lubrication circuit, arranged in a lower part of the main housing, and a partition for the separation of the main housing into two parts, in which there are arranged respectively, on the one hand, the motor and its cooling circuit, and, on the other hand, the speed reducer and its lubrication circuit, the oil sump comprising an oil overflow passage through the separating partition and, beneath the oil overflow passage, an oil channel extending through the separating partition between the two parts, the oil channel including one end discharging the oil sump on the speed reducer side provided with a valve for regulating the flow of oil between the two parts, controlled by the temperature of the oil, and one opposite free end, discharging into the oil sump on the motor side, the controlled valve being adapted to close the passage of oil in the oil channel between the two parts when the temperature of the oil on the speed reducer side reaches a predefined temperature threshold, so that the oil stored on the motor side and the oil stored on the speed reducer side do not mix when the temperature threshold is reached.

2. The device as claimed in claim 1, wherein the opposite free end of the oil channel cooperates with an oil inlet of the cooling circuit, via which the cooling circuit is capable of sucking the oil, on the one hand from the oil channel, and on the other hand directly from the part on the motor side of the oil sump.

3. The device as claimed in claim 2, wherein the oil inlet includes an inlet pipe having a cross-section substantially greater than that of the oil channel, so that the oil channel and the inlet pipe are disposed facing towards one another with a clearance between them allowing the cooling circuit to suck the oil from the part of the oil sump on the motor side through the clearance when the flow regulation valve is closed.

4. The device as claimed in claim 2, wherein the cooling circuit comprises an oil pump connected, on the one hand to the oil inlet, and on the other hand to an oil distribution circuit of the cooling circuit allowing the projection of the oil sucked by the pump onto the heating elements of the electric motor in such a way as to cool the motor, whereas the oil thus projected is collected in the part of the oil sump on the motor side.

5. The device as claimed in claim 4, wherein the electric motor comprises a motor housing including a floor, towards which the oil projected by the distribution circuit onto the heating elements of the motor flows by gravity, and a flow orifice formed in the vicinity of the floor allowing the return by gravity of the oil into the part of the oil sump on the motor side.

6. The device as claimed in claim 1, wherein the lubrication circuit comprises an oil pump capable of sucking the oil from the part of the oil sump on the speed reducer side, the oil pump being connected to a distribution circuit of the lubrication circuit allowing the projection of the oil sucked by the pump onto rotating elements of the speed reducer in such a way as to lubricate the speed reducer.

7. The device as claimed in claim 4, comprising a bypass pipe linking the oil distribution circuit of the cooling circuit and the oil distribution circuit of the lubrication circuit to either side of the separating partition, the bypass pipe being equipped with a thermostat capable of controlling selectively the circulation of oil in the bypass pipe depending on the temperature of the oil, the circulation being permitted in a temperature condition that is lower than the predefined temperature threshold and being prevented in a temperature condition that is higher than the predefined temperature threshold.

8. The device as claimed in claim 1, wherein the end of the oil channel provided with the flow regulation valve cooperates with an oil inlet of the lubrication circuit, via which the lubrication circuit is capable of sucking the oil, on the one hand from the oil channel, and on the other hand directly from the part on the speed reducer side of the oil sump.

9. The device as claimed in claim 8, wherein the oil inlet includes an inlet pipe having a cross-section substantially greater than that of the oil channel, so that the oil channel and the inlet pipe are disposed facing towards one another with a clearance between them allowing the lubrication circuit to suck the oil from the part of the oil sump on the speed reducer side through the clearance when the flow regulation valve is closed.

10. The device as claimed in claim 9, wherein the lubrication circuit comprises an oil pump connected, on the one hand to the oil inlet, and on the other hand to an oil distribution circuit of the lubrication circuit allowing the projection of the oil sucked by the pump onto rotating elements of the speed reducer in such a way as to lubricate the speed reducer.

11. The device as claimed in claim 1, wherein the main housing comprises external walls equipped with a plurality of cooling fins.

12. A motor vehicle comprising a thermal management device as claimed in claim 1.

* * * * *